United States Patent [19]

LeSuer

[11] E Patent Number: Re. 32,174

[45] Reissued Date of Patent: Jun. 10, 1986

[54] COMBINATION OF HYDROXY AMINES AND CARBOXYLIC DISPERSANTS AS FUEL ADDITIVES

[75] Inventor: William M. LeSuer, Cleveland, Ohio

[73] Assignee: The Lubrizol Corporation, Wickliffe, Ohio

[21] Appl. No.: 664,648

[22] Filed: Oct. 25, 1984

Related U.S. Patent Documents

Reissue of:

[64] Patent No.: 4,409,000
Issued: Oct. 11, 1983
Appl. No.: 330,549
Filed: Dec. 14, 1981

[51] Int. Cl.[4] ..... C10L 1/18

[52] U.S. Cl. ..... 44/70; 44/71; 44/72; 252/51.5 R; 252/51.5 A; 564/505; 564/508

[58] Field of Search ..... 44/70, 71, 72; 252/51.5 R, 51.5 A; 564/505, 508

[56] References Cited

U.S. PATENT DOCUMENTS

| | | | |
|---|---|---|---|
| 3,064,757 | 11/1962 | Mosier | 252/51.5 R |
| 3,115,400 | 12/1963 | Marsh et al. | 44/72 |
| 3,219,666 | 11/1965 | Norman et al. | 252/51.5 A |
| 3,574,577 | 4/1971 | Bialy et al. | 44/72 |
| 4,129,508 | 12/1978 | Friihauf | 252/51.5 R |

OTHER PUBLICATIONS

Armour "Ethoxylated Chemicals" Phamplet, pp. 1–23.

*Primary Examiner*—Y. Harris-Smith
*Attorney, Agent, or Firm*—Walter C. Danison, Jr.; Denis A. Polyn; Forrest L. Collins

[57] ABSTRACT

Combinations of certain hydroxy amines, particularly the "Ethomeens," and hydrocarbon-soluble carboxylic dispersants are useful as engine and carburetor detergents for normally liquid fuels. The preferred compositions are those in which the carboxylic dispersants are the reaction products of substituted succinic acids with polar compounds, especially with amines such as ethylene polyamines.

17 Claims, No Drawings

COMBINATION OF HYDROXY AMINES AND CARBOXYLIC DISPERSANTS AS FUEL ADDITIVES

Matter enclosed in heavy brackets [ ] appears in the original patent but forms no part of this reissue specification; matter printed in italics indicates the additions made by reissue.

This invention relates to new compositions of matter useful as carburetor and engine detergents in fuels, and to fuels containing such compositions. In its broadest sense, the invention is directed to compositions comprising:

(A) at least one hydroxy amine of the formula

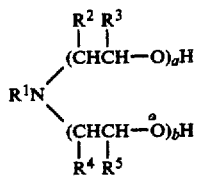

(I)

wherein:

$R^1$ is an alkyl or alkenyl radical containing from about 8 to about 30 carbon atoms or a radical of the formula

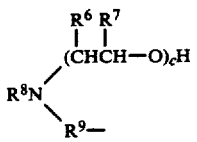

(II)

each of $R^2$, $R^3$, $R^4$, $R^5$, $R^6$ and $R^7$ is hydrogen or a lower alkyl radical;

$R^8$ is an alkyl or alkenyl radical containing from about 8 to about 30 carbon atoms;

$R^9$ is an alkylene radical containing from 2 to about 6 carbon atoms; and each of a, b and c is an integer from 1 to about 75; and (B) at least one hydrocarbon-soluble carboxylic dispersant characterized by the presence within its molecular structure of:

a substantially saturated hydrocarbon-based radical containing at least about 30 aliphatic carbon atoms, attached to at least one acyl, acyloxy or acylimidoyl radical, which is also attached through nitrogen or oxygen to a polar group.

It is well known that internal combustion engine fuels such as gasoline tend to deposit sludge and varnish in the carburetor and engine. It is of continuing interest, therefore, to develop improved detergents which inhibit the formation of such deposits.

A principal object of the present invention, therefore, is to provide compositions useful as carburetor detergents for fuels.

A further object is to provide fuel compositions with a decreased tendency to form deposits in carburetors.

Other objects will in part be obvious and will in part appear hereinafter.

As will be apparent from the above summary of the invention, the compositions of the invention contain two essential components. Component A is a hydroxy amine of Formula I in which $R^1$ is preferably an alkyl or alkenyl radical containing from about 8 to about 30 and especially from about 10 to about 25 carbon atoms. Alternatively, $R^1$ may be a radical of Formula II in which $R^8$ is in turn an alkyl or alkenyl radical containing from about 8 to about 30, preferably from about 10 to about 25, carbon atoms. Illustrative $R^1$ and $R^8$ radicals are octyl, decyl, dodecyl, tridecyl, tetradecyl, octadecyl, eicosyl, triacontanyl, dodecenyl, octadecenyl and octadecadienyl.

The radical $R^9$, if present in component A, is an alkylene radical containing from 2 to about 6 carbon atoms. It may be a straight-chain or branched-chain radical. Most often it is an ethylene, propylene or trimethylene radical, especially trimethylene.

The radicals $R^2$, $R^3$, $R^4$, $R^5$, $R^6$ and $R^7$ are each hydrogen or a lower alkyl radical, the term "lower" meaning that the radical contains up to about 7 carbon atoms. Each of these radicals is preferably hydrogen or methyl. Most often, all four of the $R^{2-5}$ radicals are hydrogen or three are hydrogen and the fourth is methyl; and $R^6$ and $R^7$, if present, are both hydrogen or one is hydrogen and the other is methyl.

The integers a and b may each be from 1 to about 75; they are most often from 1 to 10 and especially from 1 to 5. Preferably, both a and b are 1. The same is true of the integer c, if present.

Suitable amines having Formula I may be obtained by reacting a primary amine, or a diamine containing one primary and one secondary amine group, with ethylene oxide or propylene oxide. The especially preferred amines are the "Ethomeens" and "Ethoduomeens," a series of commercial mixtures of ethoxylated fatty amines available from Armak Company in which each of a, b and c (if applicable) is between 1 (and about) 50. Suitable "Ethomeens" include "Ethomeen C/12," "Ethomeen S/12," "Ethomeen T/12," "Ethomeen O/12" and "Ethomeen 18/12." In these compounds each of $R^2$, $R^3$ $R^4$, and $R^5$ is hydrogen and a and b are each 1. In "Ethomeen C/12," "S/12" and "T/12" $R^1$ is a mixture of alkyl and alkenyl groups derived respectively from coconut oil, soybean oil and tallow, and in "Ethomeen O/12" and "18/12" it is respectively oleyl and stearyl. In the corresponding "Ethoduomeens," $R^1$ has Formula II, $R^8$ is one of the radicals or radical mixtures identified above for $R^1$, $R^6$ and $R^7$ are each hydrogen, $R^9$ is trimethylene, and a, b and c are each 1. As will be apparent from a consideration of the fats and oils from which these amines are derived, $R^1$ or $R^8$ is in each instance an aliphatic hydrocarbon radical containing about 12–28 carbon atoms.

Component B in the compositions of this invention is at least one hydrocarbon-soluble carboxylic dispersant. The term "carboxylic dispersant" is used herein to designate known hydrocarbon-soluble dispersants whose molecular structure is characterized by the presence of a substantially saturated hydrocarbon-based radical containing at least about 30 aliphatic carbon atoms and at least one acyl, acyloxy or acylimidoyl radical attached to said hydrocarbon-based radical and also through nitrogen or oxygen to a polar group. For the most part, the carboxylic dispersants are the reaction products of carboxylic acids or derivatives thereof with polar reagents, including organic nitrogen-containing compounds having at least one >NH group such as amines, ureas and hydrazines, organic hydroxy compounds such as phenols and alcohols, and/or reactive metals or reactive metal compounds. British Pat. No. 1,583,924 and the following U.S. patents are incorporated by reference herein for their disclosure of suitable carboxylic dispersants:

| | | |
|---|---|---|
| 3,163,603 | 3,351,552 | 3,541,012 |
| 3,184,474 | 3,381,022 | 3,542,678 |
| 3,215,707 | 3,399,141 | 3,542,680 |
| 3,219,666 | 3,415,750 | 3,567,637 |
| 3,271,310 | 3,433,744 | 3,574,101 |
| 3,272,746 | 3,444,170 | 3,576,743 |
| 3,281,357 | 3,448,048 | 3,630,904 |
| 3,306,908 | 3,448,049 | 3,632,510 |
| 3,311,558 | 3,451,933 | 3,632,511 |
| 3,316,177 | 3,454,607 | 3,697,428 |
| 3,340,281 | 3,467,668 | 3,725,441 |
| 3,341,542 | 3,501,405 | 4,234,435 |
| 3,346,493 | 3,522,179 | Re 26,433 |

The preferred carboxylic dispersants for use as component B are those in which the acidic moiety is a substituted succinic acid. Dispersants of this type are most often prepared by the reaction of one of the above-identified polar reagents with the appropriate susbstituted succinic acylating agent. Suitable acylating agents include the acids, anhydrides, esters and acyl halides, with the acids and anhydrides being preferred.

The substituted succinic acylating agent may be prepared by the alkylation of maleic acid, fumaric acid, maleic anhydride or the like with a source of the desired hydrocarbon-based radical, which is a known reaction described in the patents incorporated by reference hereinabove. As used herein, the term "hydrocarbon-based radical" denotes a radical having a carbon atom directly attached to the remainder of the molecule and having predominantly hydrocarbon character with the context of this invention. Such radicals include the following:

(1) Hydrocarbon radicals; that is, aliphatic (e.g., alkyl or alkenyl), alicyclic (e.g., cycloalkyl or cycloalkenyl), aromatic, aliphatic- and alicyclic-substituted aromatic, aromatic-substituted aliphatic and alicyclic radicals, and the like.

(2) Substituted hydrocarbon radicals; that is, radicals containing non-hydrocarbon substituents which, in the context of this invention, do not alter the predominantly hydrocarbon character of the radical. Those skilled in the art will be aware of suitable substituents; examples are halo (especially chloro and bromo), hydroxy, alkoxy, nitro, carbalkoxy and alkylthio.

(3) Hetero radicals; that is, radicals which, while predominantly hydrocarbon in character within the context of this invention, contain atoms other than carbon present in a chain or ring otherwise composed of carbon atoms. Suitable hetero atoms will be apparent to those skilled in the art and include, for example, nitrogen, oxygen and sulfur.

In general, no more than about three substituents or hetero atoms, and preferably no more than one, will be present for each 10 carbon atoms in the hydrocarbon-based radical.

Preferably, the hydrocarbon-based radicals in component B are free from acetylenic unsaturation and have about 30 to about 5000 carbon atoms, desirably about 50 to about 300 carbon atoms. The radicals are usually hydrocarbon or chloro-substituted hydrocarbon.

The source of the hydrocarbon-based radical is generally a homopolymer or interpolymer of polymerizable olefin monomers containing about 2–16 and usually about 2–6 carbon atoms. Illustrative monomers of this type are ethylene, propylene, 1-butene, 2-butene, isobutene, 1-octene and 1-decene. The polymer may also contain units derived from polyenes, including conjugated dienes such as 1,3-butadiene and isoprene; non-conjugated dienes such as 1,4-hexadiene, 1,4-cyclohexadiene, 5-ethylidene-2-norbornene and 1,6-octadiene; and trienes such as 1-isopropylidene-3a,4,7,7a-tetrahydroindene, 1-isopropylidenecyclopentadiene and 2-(2-methylene-4-methyl-3-pentenyl)[2.2.1]bicyclo-5-heptene.

A first preferred class of polymers comprises those of terminal olefins such as propylene, 1-butene, isobutene and 1-hexene. Especially preferred within this class are polytbutenes comprising predominantly isobutene units. A second preferred class comprises terpolymers of ethylene, a $C_{3-8}$ $\alpha$-monoolefin and a polyene selected from the group consisting of non-conjungated dienes (which are especially preferred) and trienes. Illustrative of these terpolymers is "Ortholeum 2052" manufactured by E. I. duPont de Nemours & Company, which is a terpolymer containing about 48 mole percent ethylene groups, 48 mole percent propylene groups and 4 mole percent 1,4-hexadiene groups and having an inherent viscosity of 1.35 (8.2 grams of polymer in 100 ml. of carbon tetrachloride at 30° C.).

The source of the hydrocarbon-based radical contains at least about 30 and preferably at least about 50 carbon atoms. Among the olefin polymers those having a number average molecular weight (as determined by gel permeation chromatography) of about 700–5000 are preferred, although higher polymers having number average molecular weights from about 10,000 to about 100,000 or higher may sometimes be used.

In the alkylation reaction, at least one mole of unsaturated acid or acid derivative is normally used per mole of hydrocarbon-based radical source. Particularly when said source contains a substantial number of olefinic bonds, more than one mole of unsaturated acid or acid derivative may be used per mole thereof. The hydrocarbon-based radical in the resulting acylating agent should be substantially saturated; that is, at least about 95% of the carbon-carbon bonds therein should be single bonds.

The carboxylic dispersant is prepared by reacting the substituted succinic acid, anhydride or other acrylating agent with at least one of the above-identified polar reagents. Suitable nitrogen compounds are those characterized by a radical of the structure >NH wherein the two remaining valences of nitrogen are satisfied by hydrogen, amino or organic radicals bonded to said nitrogen atom through direct carbon-to-nitrogen linkages. These compounds include aliphatic, aromatic, heterocyclic, and carbocyclic amines are well as substituted ureas, thioureas, hydrazines, guanidines, amidines, amides, thioamides, cyanamides and the like. The amines are preferred.

Among the amines useful in preparing component B are monoamines. These monoamines can be secondary, i.e., those containing only one hydrogen atom bonded directly to an amino nitrogen atom. Preferably, however, they contain at least one primary amino group, i.e., a group wherein an amino nitrogen atom is directly bonded to two hydrogen atoms. The monoamines are generally substituted with $C_{1-30}$ hydrocarbon-based radicals. Preferably these hydrocarbon-based radicals are aliphatic in nature and free from acetylenic unsaturation and contain 1–10 carbon atoms. Saturated aliphatic hydrocarbon radicals containing 1–10 carbon atoms are particularly preferred.

Among the preferred monoamines are those of the general formula $HNR^{10}R^{11}$ wherein $R^{10}$ is an alkyl radical of up to ten carbon atoms and $R^{11}$ is hydrogen or an alkyl radical of up to ten carbon atoms. Other preferred monoamines are aromatic monoamines of the general formula $HNR^{12}R^{13}$ wherein $R^{12}$ is a phenyl, alkylated phenyl, naphthyl or alkylated naphthyl radical of up to ten carbon atoms and $R^{13}$ is a hydrogen atom, an alkyl radical of up to 10 carbon atoms, or a radical similar to $R^{12}$. Examples of suitable monoamines are ethylamine, diethylamine, n-butylamine, di-n-butylamine, allylamine, isobutylamine, cocoamine, stearylamine, laurylamine, methyllaurylamine, oleylamine, aniline, methylaniline, N-methylaniline, diphenylamine, benzylamine, tolylamine and methyl-2-cyclohexylamine.

Hydroxy amines are also included in the class of useful monoamines. Such compounds are the hydroxyhydrocarbyl-substituted analogs of the afore-described monoamines. Preferred hydroxy monoamines have the formulas $HNR^{14}R^{15}$ and $HNR^{16}R^{17}$, wherein $R^{14}$ is an alkyl or hydroxy-substituted alkyl radical of up to 10 carbon atoms, $R^{15}$ is hydrogen or a radical similar to $R^{14}$, $R^{16}$ is a hydroxy-substituted phenyl, alkylated phenyl, naphthyl or alkylated naphthyl radical of up to 10 carbon atoms, and $R^{17}$ is hydrogen or a radical similar to $R^{16}$, at least one of $R^{14}$ and $R^{15}$ and at least one of $R^{16}$ and $R^{17}$ being hydroxy-substituted.

Suitable hydroxy-substituted monoamines include ethanolamine, di-3-propanolamine, 4-hydroxybutylamine, diethanolamine, N-methyl-2-propylamine, 3-hydroxyaniline, N-hydroxyethylethylene diamine, N,N-di(hydroxypropyl)propylene diamine and tri(hydroxymethyl)methylamine. While in general, hydroxy amines containing only one hydroxy group will be employed as reactants, those containing more can also be used.

Heterocyclic amines are also useful, provided they contain a primary or secondary amino group. The heterocyclic ring can also incorporate unsaturation and can be substituted with hydrocarbon radicals such as alkyl, alkenyl, aryl, alkaryl or aralkyl. In addition, the ring can also contain other hetero atoms such as oxygen, sulfur, or other nitrogen atoms including those not having hydrogen atoms bonded to them. Generally, these rings have 3–10, preferably 5 or 6, ring members. Among such heterocycles are aziridines, azetidines, azolidines, pyridines, pyrroles, piperidines, imidazoles, indoles, piperazines, isoindoles, purines, morpholines, thiamorpholines, N-aminoalkyl morpholines, N-aminoalkyl thiamorpholines, azepines, azocines, azonines, azecines and tetrahydro-, dihydro- and perhydroderivatives of each of the above. Preferred heterocyclic amines are the saturated ones with 5- and 6-membered rings, especially the piperidines, piperazines and morpholines described above.

Polyamines are preferred for preparing component B. Among the polyamines are alkylene polyamines (and mixtures thereof) including those having the formula $$A-\underset{\underset{A}{|}}{N}\leftarrow R^{18}-\underset{\underset{A}{|}}{N}\rightarrow_{n}H$$

wherein n is an integer between about 1 and 10, preferably between 2 and 8; each A is independently hydrogen or a hydrocarbon or hydroxy-substituted hydrocarbon radical having up to about 30 atoms; and $R^{18}$ is a divalent hydrocarbon radical having about 1–18 carbons. Preferably A is an aliphatic radical of up to about 10 carbon atoms which may be substituted with one or two hydroxy groups, and $R^{18}$ is a lower alkylene radical having 1–10, preferably 2–6, carbon atoms. Especially preferred are the alkylene polyamines wherein each A is hydrogen. Such alkylene polyamines include methylene polyamines, ethylene polyamines, butylene polyamines, propylene polyamines, pentylene polyamines hexylene polyamines and heptylene polyamines. The higher homologs of such amines and related aminoalkyl-substituted piperazines are also included. Specific examples of such polyamines include ethylene diamine, triethylene tetramine, tris(2-aminoethyl)amine, propylene diamine, trimethylene diamine, hexamethylene diamine, decamethylene diamine, octamethylene diamine, di(heptamethylene)triamine, tripropylene tetramine, tetraethylene pentamine, trimethylene diamine, pentaethylene hexamine, di(trimethylene)triamine, 2-heptyl-3-(2-aminopropyl)imidazoline, 1,3-bis(2-aminoethyl)imidazoline, 1-(2-aminopropyl)piperazine, 1,4-bis(2-aminoethyl)piperazine and 2-methyl-1-(2-aminobutyl)piperazine. Higher homologs, obtained by condensing two or more of the above-illustrated alkylene amines, are also useful.

The ethylene polyamines, examples of which are mentioned above, are especially useful for reasons of cost and effectiveness. Such polyamines are described in detail under the heading "Diamines and Higher Amines, Aliphatic" in Kirk-Othmer, Encyclopedia of Chemical Technology, Third Edition, Vol. 7, pp. 580–602. They are prepared most conveniently by the reaction of an alkylene chloride with ammonia or by reaction of an ethylene imine with a ring-opening reagent such as ammonia. These reactions result in the production of the somewhat complex mixtures of alkylene polyamines, including cyclic condensation products such as piperazines. Because of their availability, these mixtures are particularly useful in preparing the compositions of this invention. Satisfactory products can also be obtained by the use of pure alkylene polyamines.

Hydroxy polyamines, e.g., alkylene polyamines having one or more hydroxyalkyl substituents on the nitrogen atoms, are also useful in preparing component B. Preferred hydroxyalkyl-substituted alkylene polyamines are those in which the hydroxyalkyl group has less than about 10 carbon atoms. Especially of such hydroxyalkyl-substituted polyamines include N-(2-hydroxyethyl)ethylene diamine, N,N'-bis(2-hydroxyethyl)ethylene diamine, 1-(2-hydroxyethyl)-piperazine, monohydroxypropyldiethylene triamine, dihydroxypropyltetraethylene pentamine and N-(3-hydroxybutyl)tetramethylene diamine. Higher homologs obtained by condensation of the above-illustrated hydroxyalkyl-substituted alkylene amines through amino radicals or through hydroxy radicals are likewise useful.

Other amino compounds useful for preparing dispersants include aliphatic and aromatic aminosulfonic acids such as 2-amino-2-methylpropanesulfonic acid and anthranilic acid, and polyoxyalkylene polyamines such as the "Jeffamines" available from Jefferson Chemical Co.

Component B can also be prepared from hydrazine or an organo-substituted hydrazine of the general formula

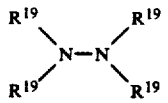

wherein each $R^{19}$ is independently hydrogen or a $C_{1-30}$ hydrocarbon radical. At least one $R^{19}$ radical is hydrogen and the others are preferably $C_{1-10}$ aliphatic groups. More preferably at least two $R^{19}$ radicals are hydrogen, and most preferably at least two such groups bonded to the same nitrogen atom are hydrogen and the remaining ones are alkyl groups of up to 10 carbon atoms. Examples of suitable substituted hydrazines are methylhydrazine, N,N-dimethylhydrazine, N,N'-dimethylhydrazine, phenylhydrazine, N-phenyl-N'-ethylhydrazine, N-(p-tolyl)-N'-(n-butyl)hydrazine, N-(p-nitrophenyl)-N-methylhydrazine, N,N'-di(p-chlorophenyl)hydrazine and N,-phenyl-N'-cyclohexylhydrazine.

Suitable organic hydroxy compounds for the preparation of component B include monohydric and polyhydric hydrocarbon-based alcohols such as methanol, ethanol, the propanols, butanols, pentanols, hexanols, heptanols, octanols, decanols, dodecanols, hexadecanols, etc., as well as the so-called fatty alcohols and their mixtures which are discussed in detail under the title "Alcohols, Higher Aliphatic" in the hereinabove-cited Encyclopedia of Chemical Technology, Third Edition, Vol. 1, pp. 716–754. Among such alcohols are lauryl, myristyl, cetyl, stearyl and behenyl alcohols.

Fatty alcohols containing minor amounts of unsaturation (e.g., no more than about two carbon-to-carbon unsaturated bonds per molecule) are also useful and are exemplified by palmitoleyl ($C_{16}H_{32}O$), oleyl ($C_{18}H_{36}O$) and eicosenyl ($C_{20}H_{40}O$) alcohols.

Higher synthetic monohydric alcohols of the type formed by the Oxo process (e.g., 2-ethylhexyl), the aldol condensation, or by organoaluminum-catalyzed oligomerization of $\alpha$-olefins (especially ethylene), followed by oxidation, are also useful. These higher synthetic alcohols are also discussed in detail under the above-cited title in Encyclopedia of Chemical Technology, Vol. 1, pp. 747–751.

Also useful as organic hydroxy compounds are the alicyclic analogs of the above-described alcohols; examples are cyclopentanol, cyclohexanol and cyclododecanol.

Polyhydroxy compounds are also useful. These include ethylene, propylene, butylene, pentylene, hexylene and heptylene glycols wherein the hydroxy groups are separated by 2 carbon atoms; tri, tetra-, penta-, hexa- and heptamethylene glycols and hydrocarbon-substituted analogs thereof (e.g., 2-ethyl-1,3-trimethylene glycol, neopentyl glycol), as well as polyoxyalkylene compounds such as diethylene and higher polyethylene glycols, tripropylene glycol, dibutylene glycol, dipentylene glycol, dihexylene glycol and diheptylene glycol, and their monoethers.

Phenol, naphthols, substituted phenols (e.g., the cresols), and dihydroxyaromatic compounds (e.g., resorcinol, hydroquinone), as well as benzyl alcohol and similar dihydroxy compounds wherein the second hydroxy group is directly bonded to an aromatic carbon (e.g., 3-$HOC_6H_4CH_2OH$) are also useful, as are sugar alcohols of the general formula $HOCH_2$—$(CHOH)_{1-5}CH_2OH$ such as glycerol, sorbitol, mannitol, etc. (described in detail under the title "Alcohols, Polyhydric" in the above-cited Encyclopedia of Chemical Technology, Vol. 1, pp. 754–778) and their partially esterified derivatives, and methylol polyols such as pentaerythritol and its oligomers (di- and tripentaerythritol, etc.), trimethylolethane and trimethylolpropane.

The preferred hydroxy compounds are alcohols containing up to about 40 aliphatic carbon atoms, and especially polyhydric alcohols containing about 2–10 carbon atoms and usually about 3–6 hydroxy groups (e.g., glycerol, pentaerythritol, sorbitol, mannitol, trimethylolethane, and trimethylolpropane). Pentaerythritol is especially preferred.

Illustrative reactive metal compounds which may be used to produce component B include lithium oxide, lithium hydroxide, lithium carbonate, lithium pentyloxide, sodium oxide, sodium hydroxide, sodium carbonate, sodium methoxide, sodium propoxide, potassium oxide, potassium hydroxide, potassium carbonate, potassium methoxide, magnesium oxide, magnesium hydroxide, magnesium carbonate, magnesium methoxide, magnesium propoxide, magnesium salt of ethylene glycol monomethyl ether, calcium oxide, calcium hydroxide, calcium carbonate, calcium methoxide, calcium propoxide, calcium pentyloxide, zinc oxide, zinc hydroxide, zinc carbonate, zinc propoxide, strontium oxide, strontium hydroxide, cadmium oxide, cadmium hydroxide, cadmium carbonate, cadmium ethoxide, barium oxide, barium hydroxide, barium carbonate, barium ethoxide, barium pentyloxide, aluminum oxide, aluminum isopropoxide, cupric acetate, lead oxide, lead hydroxide, lead carbonate, tin oxide, tin butoxide, cobalt oxide, cobalt hydroxide, cobalt carbonate, cobalt pentyloxide, nickel oxide, nickel hydroxide, nickel chloride, nickel carbonate and chromium (II) acetate.

In the reaction of the acylating agent with the polar compound, it is frequently preferred to employ a substantially inert, normally liquid organic diluent such as benzene, toluene, xylene or naphtha.

Typical carboxylic dispersants suitable for use as reagent B are listed in Table I by reactants and diluent.

TABLE 1

| Example | (I) Acylating agent | (II) Polar compound | Ratio of equivalents, I:II | Reaction temperature, °C. | Diluent |
|---|---|---|---|---|---|
| 1 | Polybutenyl (mol. wt. about 900) succinic anhydride prepared from chlorinated polybutene containing predominantly isobutene units | Polyethylene amine mixture containing about 3–7 amino groups per molecule | 0.91 | 140 | Xylene |
| 2 | Same as Example 1 | Pentaethylene hexamine | 0.41 | 140 | Xylene |
| 3 | Like Example 1 except polybutene mol. wt. is about 1050 | Pentaethylene hexamine | 0.61 | 140 | Xylene |
| 4 | Like Example 1, except polybutene mol. wt. is | Diethylene triamine | 1.0 | 140 | Xylene |

TABLE 1-continued

| Example | (I) Acylating agent | (II) Polar compound | Ratio of equivalents, I:II | Reaction temperature, °C. | Diluent |
|---|---|---|---|---|---|
| | about 850 | | | | |
| 5 | Same as Example 4 | Ethylene diamine | 1.0 | 140 | Xylene |
| 6 | Same as Example 4 | N—(2-hydroxyethyl)-trimethylene diamine | 1.06 | 140 | Xylene |
| 7 | Same as Example 1 | Pentaerythritol, followed by polyethylene amine of Example 1 (ratio of equivalents 3.4:1) | 0.79 | 140 | Xylene |
| 8 | Same as Example 1 | Same as Example 1 | 0.67 | 140 | Xylene |
| 9 | Same as Example 1 | Same as Example 1 | 1.33 | 140 | Xylene |
| 10 | Like Example 1, except polybutene mol. wt. is about 1100 | Pentaerythritol, followed by polyethylene amine of Example 1 (ratio of equivalents 7.7:1) | 0.44 | 140 | Xylene |
| 11 | Methyl ester produced by reaction of chlorinated (4.7% Cl) polybutene (mol. wt. 1000) containing predominantly isobutene units with methyl methacrylate | Triethylene tetramine | 1.0 | 140–220 | — |
| 12 | Reaction product of chlorinated (4.5% Cl) polyisobutene (mol. wt. 850) containing predominantly isobutene units with acrylic acid | Pentaethylene hexamine | 0.8 | 180–200 | — |
| 13 | Same as Example 10 | Pentaerythritol | 0.5 | 140 | Xylene |
| 14 | Like Example 1, except polyisobutene mol. wt. is about 1000 | Neopentyl glycol | 1.0 | 240–250 | — |
| 15 | Same as Example 14 | Methanol* | Excess methanol | 50–65 | Toluene |
| 16 | Same as Example 14 | Polyethylene glycol (mol. wt. about 600) | 2.0 | 240–250 | — |
| 17 | Same as Example 14 | Oleyl alcohol** | 1.0 | 140 | Xylene |
| 18 | Like Example 12, except polybutene mol. wt. is about 982 | Sorbitol | 0.48 | 140 | Xylene |
| 19 | Same as Example 18 | Pentaerythritol | 1.0 | 180–205 | — |

*Hydrogen chloride catalyst
**p-Toluenesulfonic acid catalyst

The compositions of this invention generally contain about 0.5–10.0 parts by weight of component B per part of component A. Most often the weight ratio of component B to component A is between about 1:1 and about 8:1, and preferably between about 1:1 to about 3:1.

As previously mentioned, the compositions of this invention are principally useful as carburetor detergent additives for normally liquid fuels. The invention includes fuel compositions containing the additive in combination with a major proportion of a normally liquid fuel, usually a hydrocarbonaceous petroleum distillate fuel such as motor gasoline as defined by ASTM Specification D439 and diesel fuel or fuel oil as defined by ASTM Specification D396. Normally liquid fuel compositions comprising non-hydrocarbonaceous materials such as alcohols, ethers, organonitro compounds and the like (e.g., methanol, ethanol, diethyl ether, methyl ethyl ether, nitromethane) are also within the scope of this invention as are liquid fuels derived from vegetable or mineral sources such as corn, alfalfa, shale and coal. Normally liquid fuels which are mixtures of one or more hydrocarbonaceous fuels and one or more non-hydrocarbonaceous materials are also contemplated. Examples of such mixtures are combinations of gasoline and ethanol and of diesel fuel and ether. Particularly preferred is gasoline, that is, a mixture of hydrocarbons having an ASTM distillation range from about 60° C. at the 10% distillation point to about 205° C. at the 90% distillation point.

Generally, these fuel compositions contain an amount of the composition of this invention sufficient to provide carburetor and engine detergency; usually this amount is about 10–1000 parts by weight, preferably about 25–250 parts, of the composition of this invention per million parts of fuel.

The fuel compositions can contain, in addition to the composition of this invention, other additives which are well known to those of skill in the art. These include antiknock agents, deposit preventers or modifiers such as triaryl phosphates, dyes, cetane improvers, antioxidants such as 2,6-di-tertiary-butyl-4-methylphenol, rust inhibitors such as alkylated succinic acids and anhydrides, bacteriostatic agents, gum inhibitors, metal deactivators, demulsifiers, upper cylinder lubricants and anti-icing agents.

The compositions of this invention can be added directly to the fuel, or they can be diluted with a substantially inert, normally liquid organic diluent such as naphtha, benzene, toluene, xylene or a normally liquid fuel as described above, to form an additive concentrate. These concentrates generally contain about 20–90% by weight of the compositions of this invention and may contain, in addition, one or more other conventional additives known in the art or described hereinabove.

Illustrative fuel compositions of this invention are gasolines containing the ingredients listed in Table II. All amounts are exclusive of substantially inert diluents such as xylene and mineral oil.

TABLE II

| Ingredient | Parts per million | | | | | |
|---|---|---|---|---|---|---|
| | Fuel A | B | C | D | E | F |
| "Ethomeen T/12" | — | 9.3 | — | 24.0 | — | 9.0 |
| "Ethomeen C/12" | 3.1 | — | — | — | 15.0 | — |
| "Ethoduomeen T/13" | — | — | 9.3 | — | — | — |
| Product of Example 1 | 23.2 | 20.8 | 20.8 | 53.6 | 17.7 | 18.8 |
| Isopropyl alcohol | 8.0 | 7.2 | 7.2 | 18.5 | 6.1 | — |
| Isooctyl alcohol | — | — | — | — | — | 6.9 |
| Ester-amide of fatty acid-naphthenic acid mixture | 0.7 | 1.0 | 1.0 | 2.5 | 0.5 | — |
| Polymer of hexadecene oxide | — | — | — | — | — | 0.2 |
| Fatty diamine-formaldehyde condensation product | — | — | — | — | — | 2.2 |
| Polyoxyalkylene demulsifier | 0.2 | 0.2 | 0.2 | 0.4 | 0.1 | 1.5 |

What is claimed is:

1. A composition comprising:

(A) at least one hydroxy amine of the formula

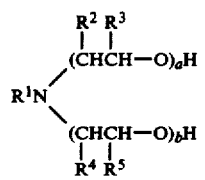

(I)

wherein:

$R^1$ is an alkyl or alkenyl radical containing from about 8 to about 30 carbon atoms or a radical of the formula

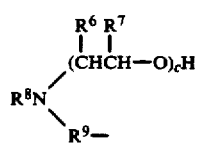

(II)

each of $R^2$, $R^3$, $R^4$, $R^5$, $R^6$ and $R^7$ is hydrogen or a lower alkyl radical;

$R^8$ is an alkyl or alkenyl radical containing from about 8 to about 30 carbon atoms;

$R^9$ is an alkylene radical containing from 2 to about 6 carbon atoms; and each of a, b and c is an integer from 1 to about 75; and (B) at least one hydrocarbon-soluble carboxylic dispersant characterized by the presence within its molecular structure of:

a substantially saturated hydrocarbon-based radical containing at least about 30 aliphatic carbon atoms, attached to at least one acyl, acyloxy or acylimidoyl radical, which is also attached [through nitrogen to a polar group] *to a radical of the structure* $-N<$ *wherein the remaining valences of nitrogen are satisfied by forming a ring structure with a second acyl group of said carboxylic dispersant, hydrogen amino or organo radicals bonded to the said nitrogen atom through direct carbon-to-carbon linkages.*

2. A composition according to claim 1 which contains about 0.5–10.0 parts by weight of component A per part of component B.

3. A composition according to claim 2 wherein component B is prepared by the reaction of a substituted succinic acid acylating agent with at least one polar reagent.

4. A composition according to claim 3 wherein the substituent on the substituted succinic acid acylating agent is derived from a homopolymer or interpolymer of polymerizable olefin monomers containing about 2–6 carbon atoms and has a molecular weight of about 700–5000.

5. A composition according to claim 4 wherein said substituent is derived from a polybutene comprising predominantly isobutene units.

6. A composition according to claim 5 which contains about 1–8 parts by weight of component B per part of component A.

7. A composition according to claim 6 wherein the polar reagent is at least one organic nitrogen-containing compound having at least one >NH group.

8. A composition according to claim 7 wherein the nitrogen-containing compound is at least one alkylene polyamine.

9. A composition according to claim 8 wherein the alkylene polyamine is an ethylene polyamine.

10. A composition according to any of claims 1–9 wherein $R^1$ is an alkyl or alkenyl radical containing from about 10 to about 25 carbon atoms, each of $R^2$, $R^3$, $R^4$ and $R^5$ is hydrogen; and each of a and b is an integer from 1 to 5.

11. A composition according to claim 10 wherein a and b are each 1.

12. An additive concentrate comprising a substantially inert, normally liquid organic diluent and about 20–90% by weight of a composition according to claim 1, 4, 5, 8, or 9.

13. An additive concentrate comprising a substantially inert, normally liquid organic diluent and about 20–90% by weight of a composition according to claim 10.

14. An additive concentrate comprising a substantially inert, normally liquid organic diluent and about 20–90% by weight of a composition according to claim 11.

15. A fuel composition comprising a major amount of a normally liquid fuel and about 10–1000 parts by weight, per million parts of said fuel, of a composition according to claim 1, 4, 5, 8 or 9.

16. A fuel composition comprising a major amount of a normally liquid fuel and about 10–1000 parts by weight, per million parts of said fuel, of a composition according to claim 10.

17. A fuel composition comprising a major amount of a normally liquid fuel and about 10–1000 parts by weight, per million parts of said fuel, of a composition according to claim 11.

* * * * *